FRAME CONSTRUCTION WITH PANEL AND YIELDABLE PREFORMED SEPARATOR THEREFOR

Filed Dec. 29, 1961 9 Sheets-Sheet 1

INVENTORS
JAMES C. WARING
LESLIE A. FREAM
BY Glenn, Palmer & Matthews
THEIR ATTORNEYS INVENTORS
JAMES C. WARING
LESLIE A. FREAM
BY Glenn, Palmer & Matthews
THEIR ATTORNEYS Aug. 23, 1966 J. C. WARING ETAL 3,267,629

FRAME CONSTRUCTION WITH PANEL AND YIELDABLE PREFORMED SEPARATOR THEREFOR

Filed Dec. 29, 1961 9 Sheets-Sheet 3

INVENTORS
JAMES C. WARING
LESLIE A. FREAM

BY Glenn, Palmer & Matthews

THEIR ATTORNEYS

INVENTORS
JAMES C. WARING
LESLIE A. FREAM
BY Glenn Palmer
& Matthews
THEIR ATTORNEYS INVENTORS
JAMES C. WARING
LESLIE A. FREAM
BY
Glenn, Palmer
& Matthews
THEIR ATTORNEYS INVENTORS
JAMES C. WARING
LESLIE A. FREAM
BY Glenn Palmer & Matthews
THEIR ATTORNEYS INVENTORS
JAMES C. WARING
LESLIE A. FREAM
BY
Glenn, Palmer
& Matthews
THEIR ATTORNEYS INVENTORS
JAMES C. WARING
LESLIE A. FREAM
BY Glenn, Palmer & Matthews
THEIR ATTORNEYS INVENTORS
JAMES C. WARING
LESLIE A. FREAM
BY Glenn, Palmer
& Matthews
THEIR ATTORNEYS

United States Patent Office 3,267,629

Patented August 23, 1966

3,267,629

FRAME CONSTRUCTION WITH PANEL AND YIELDABLE PREFORMED SEPARATOR THEREFOR

James C. Waring, Richmond, Va., and Leslie A. Fream, Louisville, Ky., assignors to Reynolds Metals Company, Richmond, Va., a corporation of Delaware Filed Dec. 29, 1961, Ser. No. 163,276
9 Claims. (Cl. 52—397)

This invention relates to improved frame constructions and to improved methods for making such frame constructions or the like. This invention also relates to improved parts for such frame constructions or the like.

Heretofore various metal frame constructions have been made for framing doors, windows and other panel means for buildings and the like. However, because of the many different designs and styles of buildings being made today, each type of frame construction must be customized to a particular job whereby prior-known constructions are inadequate or must be modified to conform to a desired design and configuration.

Further, such prior-known frame constructions are difficult and time consuming to fabricate and install and thereby require relatively skilled labor whereby the overall cost of such frame constructions are excessive.

According to the teachings of this invention, however, an improved frame construction is provided that is readily adapted to conform to any desired configuration or design in a minimum of time and effort and is adapted to be fabricated by relatively unskilled labor by the methods of this invention from a relatively small stock of basic parts, the parts being manufactured in a simple and effective manner as hereinafter described.

In this manner, the installer of such frame constructions need only maintain a supply of space-saving extruded lengths of stock that can be readily cut into desired lengths at the shop or on the job to provide frame parts to conform to a particular job. Thereafter, the cut parts are assembled together by the methods of this invention to provide an effective and attractive frame construction in a minimum of time and effort.

In particular, the frame construction manufacturer maintains a supply of frame member stock of the various types hereinafter described from which he can cut appropriate lengths therefrom to be subsequently assembled together to provide a frame construction having one or more openings to readily receive and hold desired panel means, such as glass panels, doors and the like.

The cut frame members are first asembled together in the desired position in the building structure or are preassembled together and, thereafter, inserted and secured in the appropriate opening in the building structure.

In either event, the frame members are simply and effectively assembled together by the methods and brackets of this invention in a minimum of time and effort, the assembled frame members bounding one or more openings adapted to receive doors, windows, or other panel means as desired.

Each frame member of this invention includes an inner surface means interrupted by a channel throughout its length, the inner surface means of each frame member cooperating with the inner surface means of three more frame members to define a rectangular opening.

When such opening is to be utilized to receive a door, the channels of the frame members can be suitably filled with extruded inserts of this invention so as to provide completely flat inner surface means for the frame members bounding such door. In addition one of the frame members opposite to the pivoting or hinging location of the door can be provided with a special door stop insert of this invention that is inserted in the channel of the frame member disposed opposite to the pivot point of the door, the insert carrying weather strip means, if desired.

When such opening in the frame construction is to be utilized to carry a panel means, such as a sheet of glass or the like, the panel means has an overall size greater than the rectangular opening provided by the bounding frame members.

At least one of the frame members bounding the opening to receive the afore-mentioned panel means comprises a base secured to an adjacent pair of frame members and a pair of sections secured to the base, each section defining part of the inner surface means and one side wall of the channel of that particular frame member.

When the frame members are assembled together, only one section is secured to the base whereby the over-sized panel means can be inserted into the channels of the remaining three frame members by the method of this invention as hereinafter described. Thereafter, the remaining section is secured to the base of that particular frame member to complete the same and dispose that particular edge of the panel means in the channel of that particular frame member.

Thus, the over-sized panel means has its edges respectively disposed in the channels of the frame members to thereby completely fill the opening bounded by the frame members.

Subsequently, holding means of this invention are readily disposed in each channel of the frame members to firmly hold the panel means in a fixed position relative to the frame members whereby the frame construction is completed in a simple and effective manner.

Therefore, it can be seen that the methods and structures of this invention provide means for forming frame constructions of any desired design or configuration from a few basic parts in a rapid and effective manner.

Such frame constructions of this invention are particularly adaptable for forming entrance structure for buildings and the like, the entrance structure including one or more doors and one or more picture-type windows or other panel means. However, this invention is not to be limited to only entrance-type of frame constructions as many different types of frame constructions can be provided according to the teachngs of this invention.

Accordingly, it is an object of this invention to provide an improved frame construction having one or more of the novel features set forth above or hereinafter shown or described.

Another object of this invention is to provide an improved method for making such a frame construction or the like.

A further object of this invention is to provide improved frame members for such a frame construction or the like.

Another object of this invention is to provide improved inserts for such a frame construction or the like.

Another object of this invention is to provide improved brackets for such a frame construction or the like.

A further object of this invention is to provide improved holding means for such a frame construction or the like.

Other objects, uses and advantages of this invention are apparent from a reading of this description which proceeds with reference to the accompanying drawings forming a part thereof and wherein.

Figure 1:
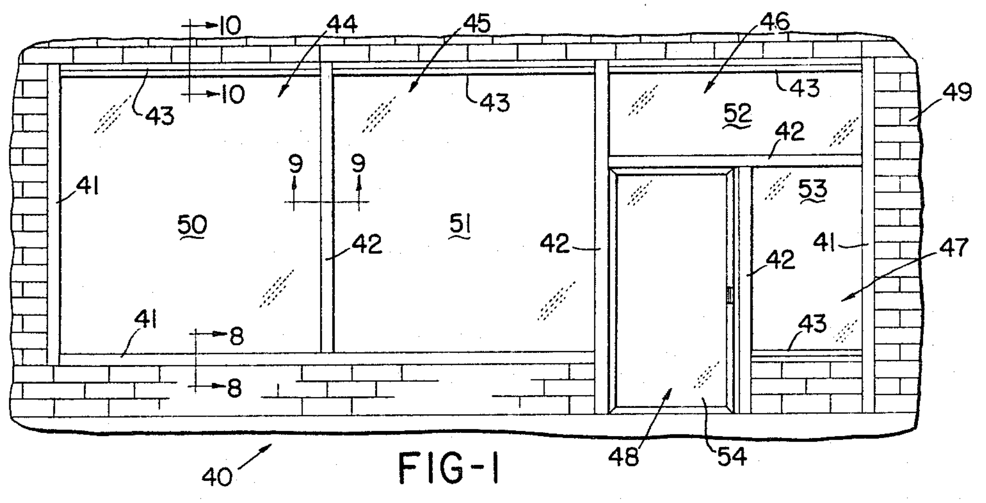
FIGURE 1 is a fragmentary, side elevation view illustrating one typical frame construction of this invention.

While the various embodiments of this invention are illustrated in the drawings and are hereinafter described as providing frame constructions having one or more rectangular openings provided therein, it is to be understood that the frame members of this invention could be so assembled to define openings having any number of sides, as desired. Therefore, this invention is not to be limited to only the embodiments thereof illustrated in the drawings, as the drawings are merely utilized to illustrate some of the wide variety of uses of this invention.

Further, while certain specific dimensions are given for the frame members hereinafter described, it is to be understood that such dimensions are merely examples that have been found to be satisfactory and are not to be limitations of this invention, as any desired dimensions can be utilized.

Referring now to FIGURE 1, an improved frame construction of this invention is generally indicated by the reference numeral 40 and comprises a plurality of frame members 41, 42, and 43 of this invention effectively assembled together in a manner hereinafter described to define a plurality of rectangular openings 44, 45, 46, 47, and 48 in a wall 49 of a building or the like, the openings 44, 45, 46, and 47 respectively receiving panel means 50, 51, 52, and 53, each comprising a rectangular sheet of plate glass having an overall size greater than the respective opening filled thereby, and the opening 48 receiving a suitable door 54 in a manner hereinafter described.

While the frame construction 40 is illustrated in FIGURE 1 as having a particular design and configuration to provide five rectangular openings 44–48, it is to be understood that the frame members 41, 42, and 43 can be assembled together in any suitable manner to form a frame construction having one or more rectangular openings for receiving any desired panel means or the like, this invention not being limited to only the configurations illustrated in the drawings.

Figure 2:
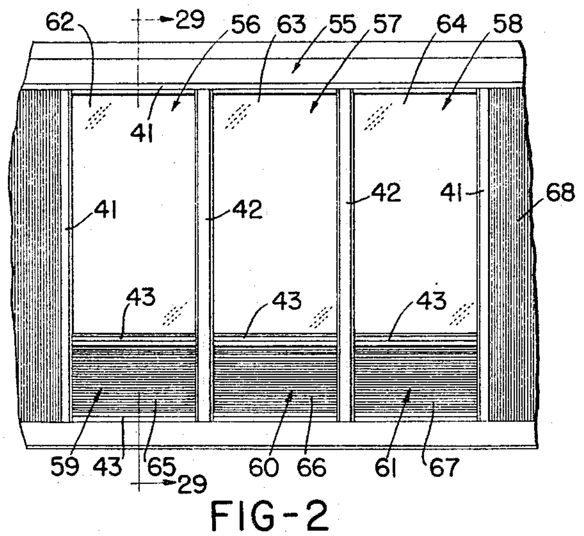
FIGURE 2 is a view similar to FIGURE 1 and illustrates another frame construction of this invention.

For example, as illustrated in FIGURE 2, the frame members 41, 42 and 43 can be assembled together in a manner hereinafter described to define a frame construction 55 having a plurality of rectangular openings 56, 57, 58, 59, 60 and 61 respectively receiving panel means 62, 63, 64, 65, 66 and 67 each having an overall size greater than the rectangular opening receiving the same. The panel means 62–64 can comprise glazed panel means, while the panel means 65–67 can comprise opaque panel means to provide a pleasing and attractive frame construction 55 for a wall 68 of the building or the like. Thus, this invention is not to be limited to entrance frame constructions as illustrated in FIGURE 1 and hereinafter specifically described.

Figure 3:
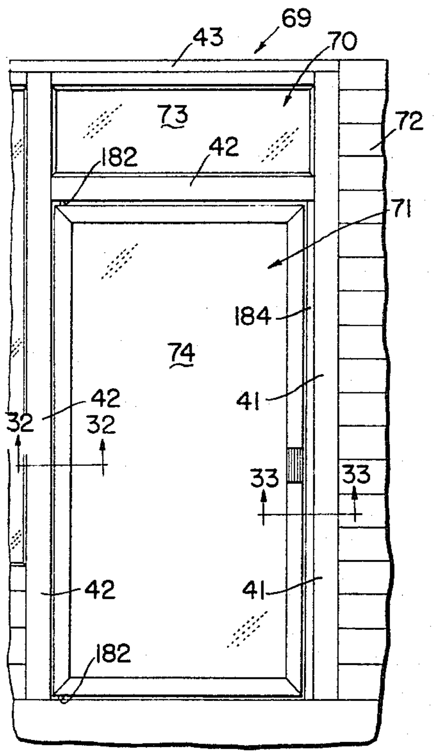
FIGURE 3 is a fragmentary, side elevation view illustrating another frame construction of this invention.

Another frame construction 69 of this invention is illustrated in FIGURE 3 and is formed from the frame members 41, 42 and 43 in a manner hereinafter described to define a pair of rectangular openings 70 and 71 in a wall 72 of a building or the like, the rectangular opening 70 receiving an over-sized, glazed panel means 73 and the opening 71 receiving a glazed door 74 in a manner hereinafter described.

Therefore, it can be seen that the frame members 41, 42 and 43 of this invention can be assembled together in any desired manner, according to the teachings of this invention, to provide a frame construction having one or more rectangular openings provided therein, the rectangular openings receiving panel means of any desired type. However, as will be apparent hereinafter, an important feature of this invention is to attempt to arrange the frame members 41, 42 and 43 in such a manner that the rectangular opening bounded thereby has at least one side thereof formed by a frame member 43 when that particular rectangular opening is to receive a rectangular panel means having an overall size greater than the rectangular opening receiving the same. However, this invention is not to be limited to such an arrangement.

It is also to be understood that this invention is not to be limited to frame constructions defining rectangular openings, as the frame members of this invention can be utilized to define openings having any desired number of sides.

While the frame members 41, 42 and 43 can be formed in any suitable manner and of any suitable material, the embodiment of the frame members 41, 42 and 43 illustrated in the drawings are formed by extruding metal, such as aluminum-containing metal or the like, into desired stock lengths whereby the individual frame members can be subsequently cut from the appropriate stock into the desired lengths to form a desired frame construction.

Figures 4, 5, 6, 7:
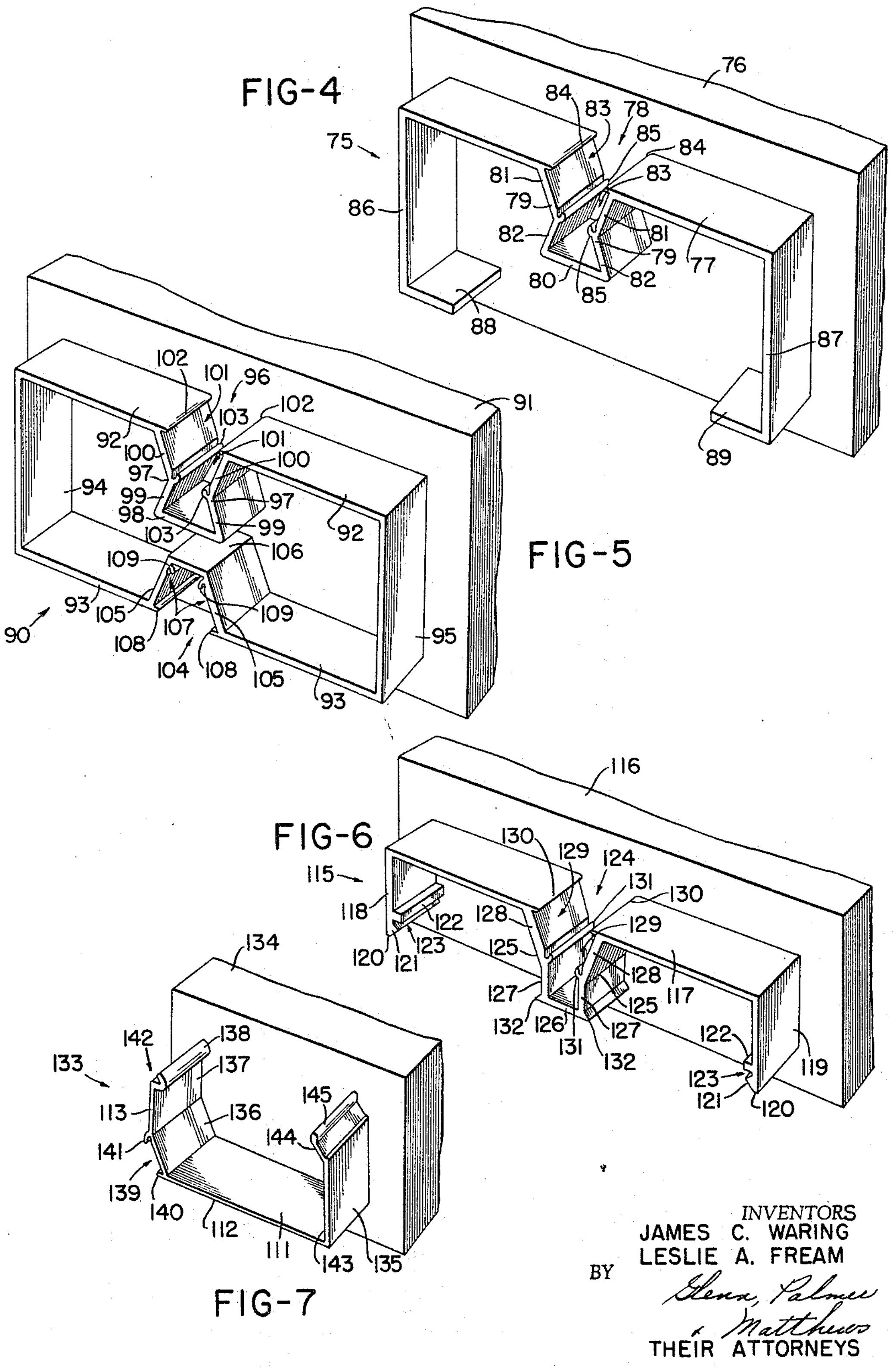
FIGURE 4 is a fragmentary, perspective view illustrating the method of forming one of the frame members of this invention.
FIGURE 5 is a view similar to FIGURE 4 and illustrates the method of making another frame member of this invention.
FIGURE 6 is a view similar to FIGURE 4 and illustrates the method of making the base of still another frame member of this invention.
FIGURE 7 is a view similar to FIGURE 6 and illustrates the method of making one of the sections to be secured to the base of FIGURE 6 to form a frame member of this invention.

In particular, the frame members 41 are formed by cutting the same to desired lengths from frame member stock 75, FIGURE 4, extruded from a conventional extruding apparatus 76 in a manner well known in the art.

The frame member stock 75 and, thus, the frame member 41 cut therefrom, comprises a substantially rectangular structure having an inner surface means 77 medially interrupted by a channel 78, the channel 78 being defined by a pair of opposed side walls 79 and an end wall 80 and having a substantially hourglass cross-sectional configuration. Each channel-defining side wall 79 is formed by two sections 81 and 82, the adjacent sections 82 of the side walls 79 converging toward each other as they extend away from the end wall 80 while the sections 81 diverge away from each other as they approach the inner surface means 77 to define the afore-mentioned hourglass cross-sectional configuration of the channel 78 for a purpose hereinafter described.

Each section 81 of the side walls 79 is provided with a groove 83 for a purpose hereinafter described, each groove 83 being bounded by a pair of angularly disposed lips 84 and 85 converging toward each other as they extend away from the respective side wall 79.

The inner surface means 77 of the extruded frame member stock 75 is integrally interconnected to the channel-defining side walls 79 and end wall 80, as well as to a pair of opposed parallel end walls 86 and 87. The end walls 86 and 87 are respectively integrally connected at the other ends thereof to inwardly facing flanges or feet 88 and 89 disposed parallel to the inner surface means 77.

While the frame member stock 75 can have any desired dimensions, one embodiment thereof which has been found satisfactory to form the various frame constructions of this invention has the following dimensions.

The width of the inner surface means 77 is approximately 4.500 inches, while the width of the end walls 86 and 87 is approximately 1.750 inches and the width of the feet or flanges 88 and 89 is approximately 0.750 of an inch. The depth of the channel 78 is approximately 0.766 of an inch, while the width thereof between the lips 85 is approximately 0.500 of an inch and the width between the lips 84 is approximately 0.740 of an inch. The average thickness of the frame member stock 75 is approximately 0.109 of an inch.

The frame members 41 cut from the frame member stock 75 can be utilized as jambs, sills and headers of various frame constructions, as illustrated in FIGURES 1–3.

The frame members 42 are formed by cutting suitable lengths from frame member stock 90, FIGURE 5, extruded by a conventional extruding apparatus 91 in a manner well known in the art.

The frame member stock 90 and, thus, the frame member 42 cut therefrom, have the same configuration which comprises a substantially closed rectangular structure having a pair of opposed parallel inner surface means 92 and 93 interconnected together by a pair of opposed parallel end walls 94 and 95.

The inner surface means 92 of the frame member stock 90 is medially interrupted by a channel 96 in the same manner that the channel 78 interrupts the inner surface means 77 of the frame member stock 75 previously described.

In particular, the channel 96 of the frame member stock 90 is defined by a pair of opposed side walls 97 interconnected together at one end thereof by an end wall 98 to provide an hourglass-like cross-sectional configuration of the channel 76. Each side wall 97 is formed of two sections 99 and 100, with the adjacent sections 99 converging toward each other as they extend away from the end wall 98 and with the adjacent sections 100 diverging away from each other as they near the inner surface means 92.

The sections 100 of the side walls 97 of the frame member stock 90 are provided with grooves 101 bounded on each side thereof by angularly disposed lips 102 and 103 for a purpose hereinafter described, the grooves 101 being identical to the grooves 83 of the frame member stock 75 of FIGURE 4.

The other inner surface means 93 of the frame member stock 90 is medially interrupted by a channel 104 defined by a pair of opposed side walls 105 and an end wall 106. The side walls 105 diverge away from each other as they near the inner surface means 93 and are respectively provided with grooves 107 bounded by lips 108 and 109 on each side thereof in the same manner as the lips 102 and 103 previously described. The channel 104 has a truncated triangular cross-sectional configuration identical to the cross-sectional configuration of the outer half of the channel 96 or 78.

When the frame member stock 75 has the above dimensions, the frame member stock 90 has dimensions compatible therewith as follows.

The overall width of the inner surface means 92 and 93 of the frame member stock 90 is approximately 4.500 inches, with the end walls 94 and 95 having a width of approximately 1.750 inches. The channel 76 of the frame member stock 90 has the same dimensions as the channel 78 of the frame member stock 75, while the channel 104 of the frame member stock 90 has the same dimensions as the outer portion of the channel 96, as will be apparent hereinafter. The average thickness of the frame member stock 90 is approximately 0.109 of an inch.

The frame members 42 cut from the frame member stock 90 are normally utilized as mullions and the like where adjacent panel means are to be joined together. However, the frame members 42 can be utilized as jambs, sills and headers, if desired.

The frame members 43 of this invention, as illustrated in cross section in FIGURE 10, each comprises a plurality of parts suitably connected together in a manner hereinafter described.

Figures 8, 9, 10, 11, 12:
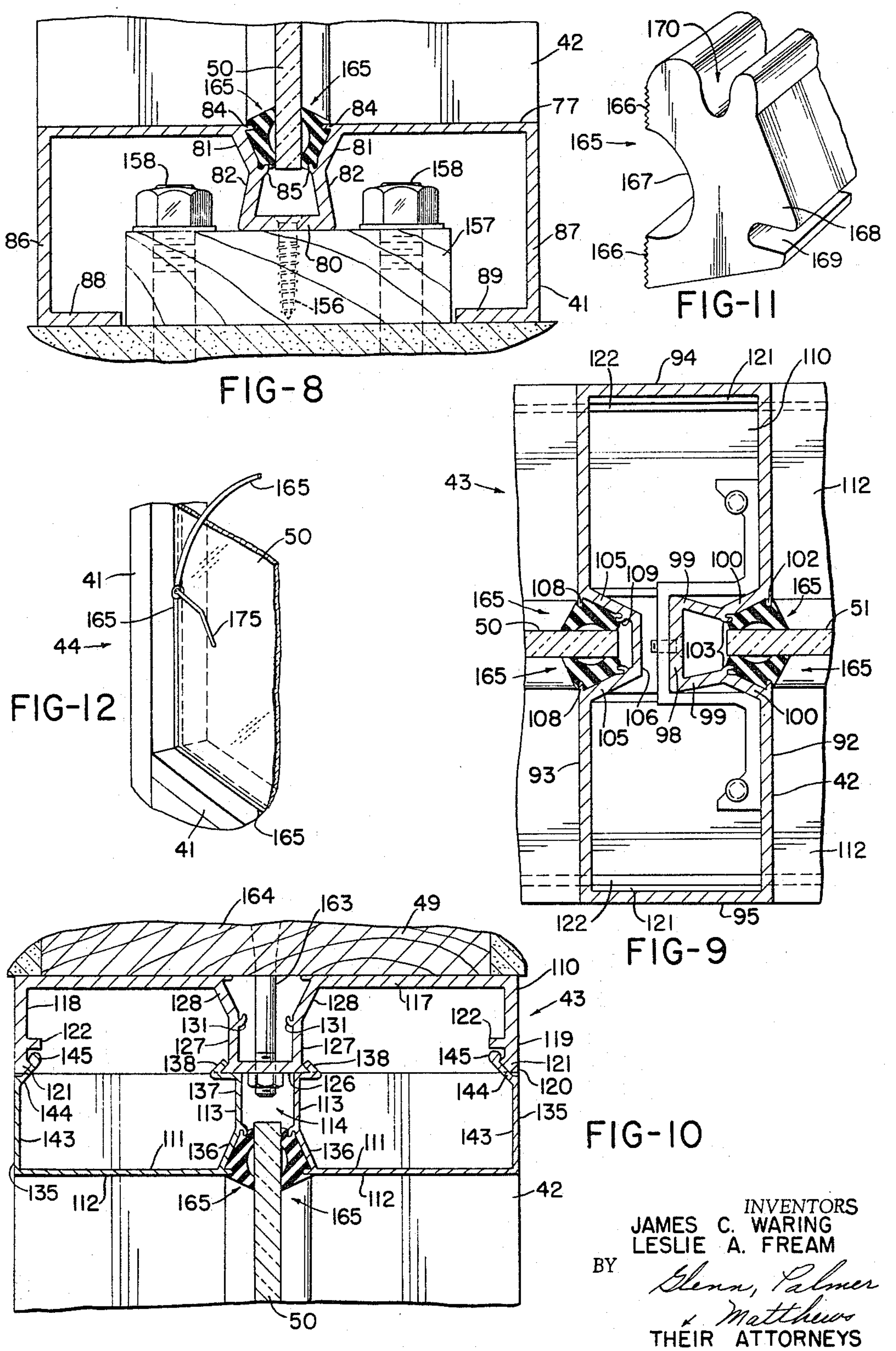
FIGURE 8 is an enlarged, fragmentary, cross-sectional view of the frame construction illustrated in FIGURE 1 and is taken substantially on line 8—8 thereof.
FIGURE 9 is a view similar to FIGURE 8 and is taken on line 9—9 of FIGURE 1.
FIGURE 10 is a view similar to FIGURE 8 and is taken on line 10—10 of FIGURE 1.
FIGURE 11 is an enlarged, fragmentary, perspective view illustrating the panel holding means of this invention.
FIGURE 12 is a fragmentary, perspective view schematically illustrating the method of inserting the holding means of FIGURE 11 in the various frame constructions of this invention.

In particular, the frame member 43 illustrated in FIGURE 10 includes a base 110 and a pair of sections 111 interconnected thereto to define an inner surface means 112 of the frame member 43 and opposed side walls 113 of a channel 114 medially interrupting the inner surface means 112.

As illustrated in FIGURE 6, the bases 110 of the frame members 43 are formed by cutting suitable lengths from base stock member 115 extruded by a conventional extruding apparatus 116, in a manner well known in the art.

The base member stock 115 and thus the bases 110 cut therefrom, has an inner surface means 117 interconnected at the outer ends thereof to a pair of end walls 118 and 119, the end walls 118 and 119 being disposed parallel to each other and being substantially identical throughout the lengths thereof.

Each end wall 118 and 119 has an enlarged free end 120 defined by a lower flange 121 having a triangular cross-sectional configuration and cooperating with an upper flange 122 having a rectangular cross-sectional configuration to define a groove 123 therebetween for a purpose herein after described.

The inner surface means 117 of the base member stock 115 is medially interrupted by a channel 124 defined by a pair of opposed side walls 125 and an end wall 126. Each side wall 125 comprises two sections 127 and 128, the sections 127 being disposed parallel to each other and the sections 128 of the side walls 125 diverging away from each other as they near the inner surface means 117.

The sections 128 of the side walls 127 are provided with grooves 129 in a manner similar to the grooves 83, 101 and 107 previously described, the grooves 129 being bounded by angularly disposed lips 130 and 131.

The end wall 126 of the base member stock 115 extends outwardly beyond the side walls 127 a suitable distance to define a pair of opposed flanges 132 respectively having triangular cross-sectional configurations for a purpose hereinafter described.

When the frame member stock 75 has the above dimensions, the base member stock 115 has dimensions to be compatible therewith, as follows.

The width of the inner surface means 117 is approximately 4.500 inches, while the width of the end walls 118 and 119 thereof are approximately 0.875 of an inch. The upper portion of the channel 124 has the same dimensions as the upper portions of the channels 78 and 96, while the width of the lower portion thereof is approximately 0.620 of an inch between the sections 127 of the side walls 125 thereof.

Each section 111 of the frame members 43 are formed by cutting suitable lengths from section member stock 133 illustrated in FIGURE 7 and extruded by conventional extruding apparatus 134 in a manner well known in the art.

The section member stock 133 has a pair of opposed side walls 113 and 135 respectively connected to the opposed ends of the inner surface means 112 thereof, the side wall 113 of each section 111 cut from the section member stock 133 cooperating with another section 111, in the manner illustrated in FIGURE 10, to define the channel 114 interrupting the inner surface means 112 of the frame member 43 when the sections 111 are assembled to a base 110.

The side wall 113 comprises three integrally connected sections 136, 137 and 138, the section 136 being angularly disposed relative to the inner surface means 112 and diverging away from the opposed side wall 135, as illustrated in FIGURE 7. The section 136 of the side wall 113 is provided with a groove 139 on the outer surface thereof, which is bounded by a pair of angularly disposed lips 140 and 141 in the same manner that the grooves 83 are formed in the frame member stock 75 previously described.

The end section 138 of the side wall 113 is overturned to define a groove 142 which is adapted to receive one of the flanges 132 of the base 110 in a manner hereinafter described when the section 111 is assembled thereto.

The side wall 135 of the section member stock 133 comprises three sections 143, 144 and 145 integrally interconnected together, the section 145 being disposed at right angles to the inner surface means 112, while the section 144 is angularly disposed relative thereto and converges toward the opposed side wall 113, as illustrated in FIGURE 7. The section 145 connected on the outer end of the section 144 of the side wall 135 is enlarged and has an arcuate cross section, the section 145 adapted to be received in a groove 123 provided in the enlarged end 120 of the base 110 when the section 111 is assembled thereto in the manner illustrated in FIGURES 20 and 21.

Figure 20:
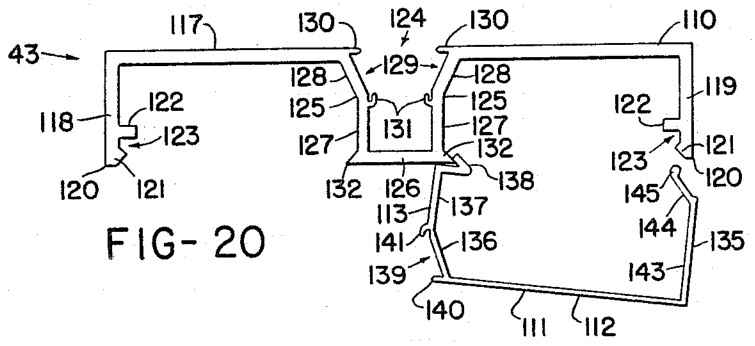
FIGURE 20 is an end view illustrating the intial step of assembling a section of FIGURE 7 to the base of FIGURE 6 to form part of one of the frame members of this invention.
Figure 21:
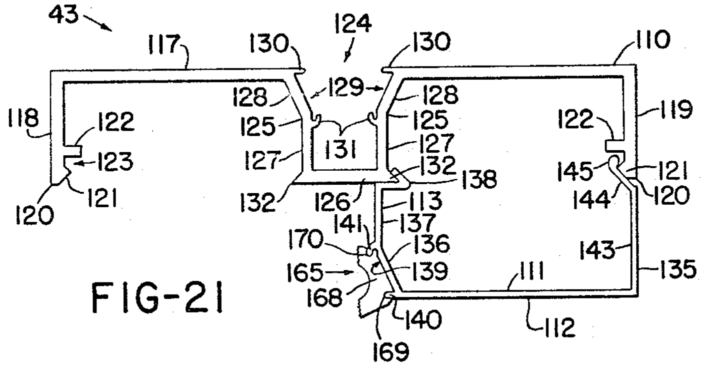
FIGURE 21 is a view similar to FIGURE 20 and illustrates the section and base of FIGURE 20 in their fully assembled position.

In particular, when it is desired to assemble a section 111 to a base 110 to form part of a frame member 43, the turned-over end 138 of the section 111 is inserted around a flange 132 on the base 110, in the manner illustrated in FIGURE 20, whereby the flange 132 is received in the groove 142 of the section 111. Thereafter, the side wall 135 of the section 111 is moved toward the end wall 119 of the base 110, whereby the enlarged beaded end 145 of the side wall 135 cams against the beveled flange 121 of the end wall 119 to cause the side wall 135 to bend toward the side wall 113. As soon as the enlarged end 145 of the side wall 135 of the section 111 passes beyond the flange 121 of the end wall 119 of the base 110, the enlarged head 145 springs into the groove 123 of the end wall 119 to interconnect the section 111 to the base 110, as illustrated in FIGURE 21. Because the section 111 is resilient, such snap-fit relation is possible, whereby once the section 111 is snap-fitted to the base 110 in the manner illustrated in FIGURES 20 and 21, the section 111 is firmly attached thereto and cannot be released therefrom until the end wall 135 is pushed inwardly a sufficient distance for the enlarged head 145 thereof to clear the beveled flange 121 of the section 110.

Thus, a pair of sections 111 can be assembled to a base 110 in the above manner to provide a frame member 43 for a purpose hereinafter described, the sections 111 being assembled to the base 110 in a simple and rapid manner, without requiring additional fastening means or the like.

When a pair of sections 111 are assembled to a base 110, as illustrated in FIGURE 10, the sections 110 cooperate together to define a channel 114 interrupting the inner surface means 112 thereof, the outer portion of the channel 114 being identical to the outer portions of the channels 78, 96 and 124 previously described.

The section member stock 133 is formed with dimensions to be compatible with the base member stock 115 to permit the cut sections 111 to be assembled to a cut base 110 in the above manner. For example, when the sections 111 are assembled to a base 110, the overall width of the interconnected side walls 135, 119 and 135, 118 is approximately 1.750 inches to conform to the width of the frame members 41 and 42 to, thereby, provide frame constructions having uniform dimensions.

The frame members 43 can be utilized as jambs, sills, mullions and headers, as desired.

Therefore, it can be seen that the frame members 41, 42 and 43 can be formed from only four basic extrusions 75, 90, 115 and 133, when desired.

While it is preferred that the frame member stock 75, 90, 115 and 133 be formed by extruding a desired material in a simple and effective manner, it is to be understood that the frame members 41, 42 and 43 can be formed in any other desired manner.

Figures 13, 14, 15, 16:
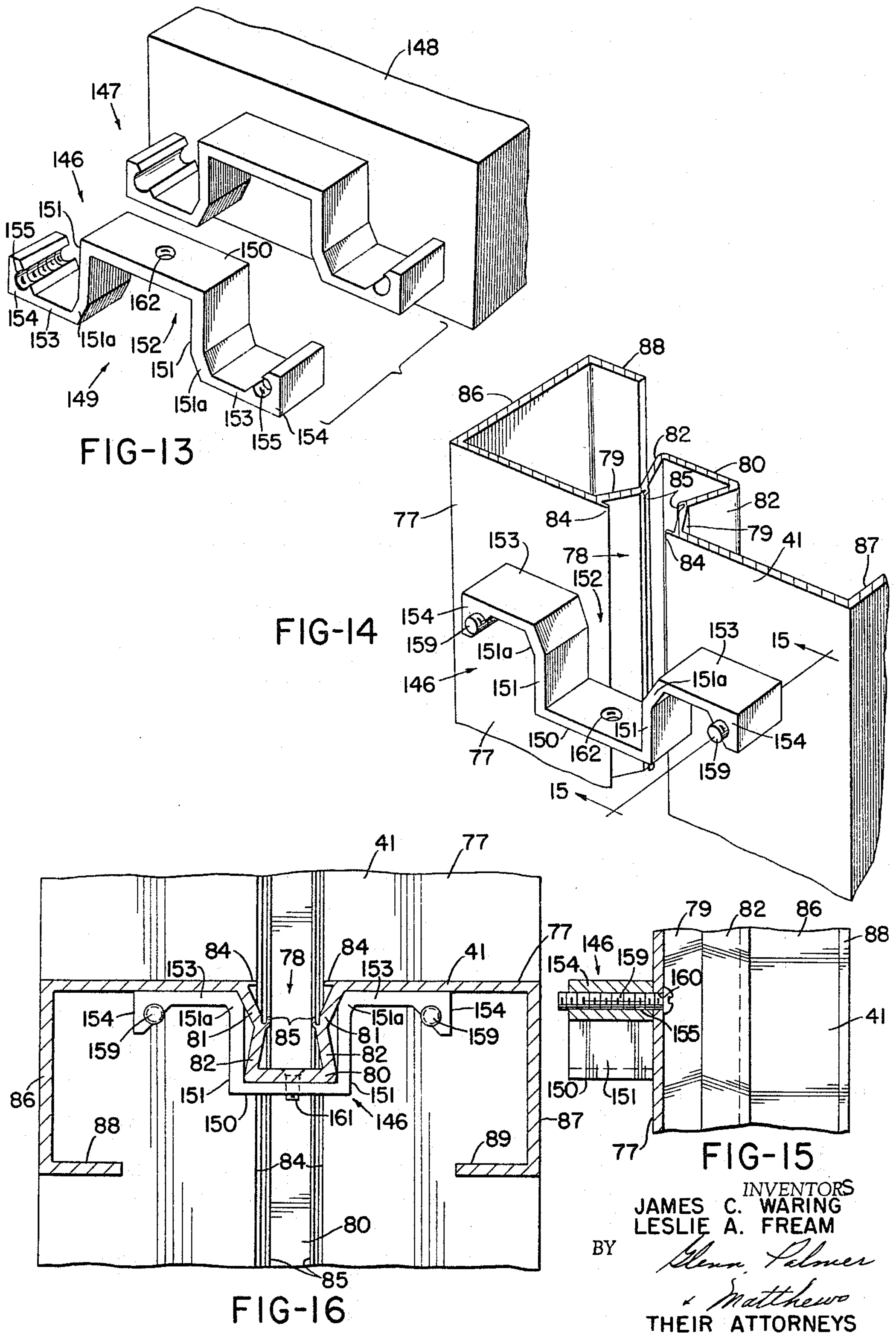
FIGURE 13 is a fragmentary, perspective view illustrating the method of forming an improved bracket of this invention for securing together adjacent frame members of this invention.
FIGURE 14 is a fragmentary, perspective view illustrating the bracket of FIGURE 13 secured to one of the frame members of this invention.
FIGURE 15 is a fragmentary, cross-sectional view of the assembly illustrated in FIGURE 14 and is taken on line 15—15 thereof.
FIGURE 16 is a fragmentary, cross-sectional view illustrating the method of assembling another frame member to the bracket assembly illustrated in FIGURE 14.

While the frame members 41, 42 and 43 can be assembled together in any desired manner and in any desired sequence, the same can be assembled together according to the teachings of this invention by utilizing brackets 146 illustrated in FIGURE 13 and suitably cut in any desired lengths from bracket member stock 147 extruded by a conventional extruding apparatus 148 in a manner well known in the art.

Each bracket 146, FIGURE 13, comprises a U-shaped portion 149 having an end wall 150 and a pair of opposed side walls 151 interconnected thereto and cooperating therewith to define a U-shaped channel 152, the outer ends 151*a* of the legs 151 diverging away from each other at the open end of the channel 152 for a purpose hereinafter described.

The free ends of the side walls 151 of the bracket 146 are integrally interconnected to a pair of outwardly directed legs 153 respectively having enlarged ends 154. Each enlarged end 154 is provided with a bore 155 passing transversely therethrough to receive threaded fastening members in a manner hereinafter described. As illustrated in FIGURE 13, the bores 155 interrupt the exterior surface of the enlarged ends 154 throughout the length thereof. If desired, the bores 155 can be threaded by suitable machinery or can be threaded by the fastening members themselves, as will be apparent hereinafter.

When the frame members 41, 42 and 43 have the aforementioned dimensions, the bracket member stock 147 can have the following dimensions to be compatible therewith.

The bracket member stock 147 has an overall width of approximately 2.875 inches, while the width of the legs 151 thereof is approximately 0.766 of an inch. The channel 152 has a width of approximately 1.116 inches at the end wall 150 thereof and a width of approximately 1.232 inches at the mouth thereof. The average thickness of the bracket member stock 147 is approximately 0.100 of an inch.

The various frame constructions of this invention can each be rapidly formed from the frame members 41, 42 and 43, brackets 146 and various fastening members hereinafter described in a simple and effective manner. Thus, the frame construction installer need only maintain a supply of extruded stock 75, 90, 115, 133 and 147, in a space-saving relation to form any of the frame constructions of this invention or others having any desired configuration.

If desired, the subsequently exposed surfaces of the stock 75, 90, 115 and 133 can be pre-coated with any suitable color medium in a manner well known in the art or can remain natural, as desired. Thus, the various frame constructions of this invention can present any desired configuration and color, as desired.

The method for interconnecting together the frame members 41, 42 and 43 will now be described.

Taking the frame construction 40 illustrated in FIGURE 1 as being exemplary of the various frame constructions that can be formed, the installer can cut the various frame member stock 75, 90, 115, 133 and 147 to the desired lengths, either at the shop or on the job location, by a simple sawing operation. Thereafter, the various cut frame members 41, 42 and 43 can be assembled together by the brackets 146 to provide the frame construction 40 that can be subsequently disposed in an appropriate opening formed in the wall 49 of a building in a manner hereinafter described, or the various frame members 41, 42 and 43 can be assembled in the opening in the wall 49 individually, as desired.

In either event, the brackets 146 are adapted to fasten the adjacent frame members 41, 42 and 43 together, as hereinafter described.

For example, the sills and jambs of the frame construction 40 can be formed from cut frame members 41 secured to the appropriate wall structure by fastening members 156, FIGURE 8, passing through appropriate apertures formed in the end walls 80 thereof. If desired, the structure of the wall 49 bounding the portion of the opening receiving the frame members 41 of the frame construction 40 can be provided with wooden supports 157 secured thereto by anchor bolts 158, the wooden supports 157 being so constructed and arranged that the feet 88 and 89 of the frame members 41 can be telescoped over the same and have the end walls 80 thereof abut the supports 157 in the manner illustrated in FIGURE 8.

However, before the frame members 41 are assembled to the wall 49 in the above manner, the brackets 146 are secured to the inner surface means 77 of the frame members 41 at the proper location thereof to subsequently join adjacent frame members thereto, as illustrated in FIGURES 14 and 15.

For example, when it is desired to join the sill 41 to the left-hand jamb 41 illustrated in FIGURE 1, a bracket 146 is assembled to the inner surface means 77 of the jamb 41, as illustrated in FIGURES 14 and 15, by having a plurality of threaded fastening members 159 passing through suitably formed apertures 160 provided in the inner surface means 77 thereof and adapted to be threadedly received in the bores 155 formed in the enlarged ends 154 of the bracket 146. The bracket 146 is secured to the frame member 41 in such a manner that the channel 152 of the bracket is bisected by the channel 78 of the frame member 41 and has the open end thereof facing upwardly. In this manner, any desired number of brackets 146 can be secured to the inner surface means 77 of the jamb 41 in the desired location before the jamb 41 is installed in the opening provided in the wall 49.

Figure 17:
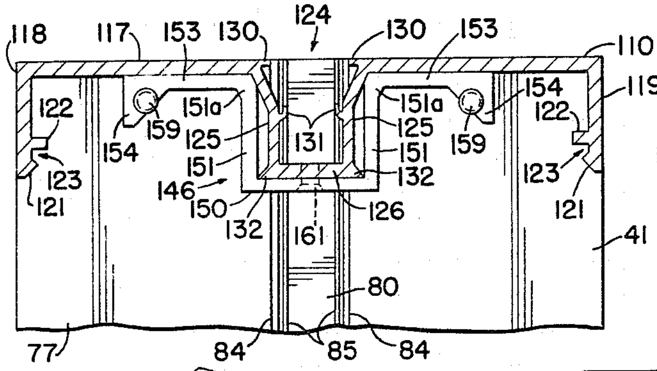
FIGURE 17 is a fragmentary, cross-sectional view illustrating the method of assembling two frame members of this invention together by a bracket of this invention.

In particular, one bracket 146 is secured to the inner surface means 77 of the jamb 41 in a location to secure the horizontal sill 41 thereto and another bracket 146, FIGURE 17, is secured to the jamb 41 in a location to secure the base 110 of the header 43 thereto.

After the brackets 146 have been secured to the left-hand jamb 41 of the frame construction illustrated in FIGURE 1, the jamb 41 is secured to the wall 49 in the manner illustrated in FIGURE 8.

Thereafter, the left-hand end of the horizontal sill 41 can be assembled to the left-hand jamb 41 in the manner illustrated in FIGURE 16.

In particular, the sill 41 is disposed over the secured bracket 146 whereby the channel 152 of the bracket 146 snugly receives the end wall 80 and side walls 79 of the sill 41. When the end wall 80 of the sill 41 abuts the end wall 150 of the bracket 146, the inner surface means 77 of the sill 41 abuts the legs 153 of the bracket 146, the diverging portions 151*a* of the side walls 151 of the bracket 146 engaging the outer sections 81 of the side walls 79 of the sill 41 whereby the jamb 41 and sill 41 are positively aligned relative to each other. A fastening member 161 passes through a suitable aperture in the end wall 80 of the sill 41 and is threadedly received in an aperture 162 formed in the end wall 150 of the bracket 146.

In this manner, the adjacent frame members 41 are secured together by the bracket 146, as illustrated in FIGURE 16.

As previously described, the bores 155 and aperture 162 of each bracket 146 can be previously threaded so as to provide the threaded relation for the fastening members 159 and 161. However, if desired, the bores 155 and aperture 162 of the bracket 146 can be unthreaded, whereby the fastening members 159 and 161 cut their own threads therein when the same are utilized to fasten the various frame members together.

The horizontally disposed headers or frame members 43 are adapted to be secured to the vertically extending jambs 41 and the mullions 42 of the frame construction 40, in the manner illustrated in FIGURE 17, after the mullions 42 have their lower ends secured to the sill 41 by the brackets 146 in the manner previously described.

In particular, the brackets 146 had previously been secured to the inner surface means 77 of the jambs 41 and mullions 42 by the fastening members 159 in the manner previously described.

Thereafter, the bases 110 of the frame members 43 are secured to the brackets 146 at each end thereby by having the side walls 125 and end wall 126 thereof snugly received in the channels 152 of the brackets 146 in the manner illustrated in FIGURE 17, whereby the end walls 126 of the bases 110 abut against the end walls 150 of the brackets 146, while the under surface of the inner surface means 117 thereof abuts against the legs 153 of the brackets 146. The end walls 150 of the brackets 146 are then secured to the end walls 126 of the bases 110 by fastening members 161, the fastening members 161 passing first through the end wall 150 of the brackets 146 and then into the end walls 126 of the bases 110.

However, if only a single header 43 is to extend between the jambs 41, the base 110 thereof has the opposed ends thereof secured to the jambs 41 in the above manner.

Figure 19:
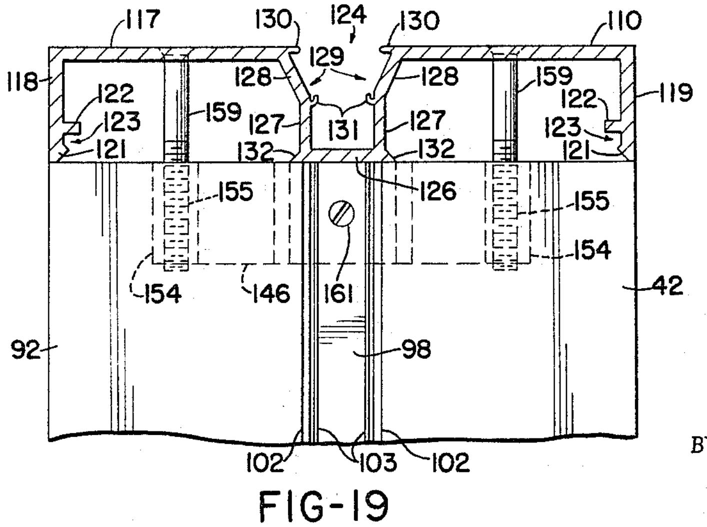
FIGURE 19 is a view similar to FIGURE 17 and illustrates another method of assembling two frame members of this invention together by a bracket of this invention.

Before the base 110 of the single frame member 43 is secured to the end jambs 41, brackets 146 are secured to the end wall 126 thereof in the manner illustrated in FIGURE 19 at points adjacent where the vertical mullion 42 and left-hand door jamb 42 are to abut the same.

As illustrated in FIGURE 19, the brackets 146 are secured to the end wall 126 of the base 110 by a plurality of fastening members 159 passing through the inner surface means 117 of the base 110 and being threadedly received in the bores 155 of the brackets 146.

Thereafter, the vertical mullion 42 and left-hand door jamb 42 can be secured to the brackets 146 by the fastening members 161. In particular, the fastening member 161 passes through a suitable aperture in the end wall 98 of the mullion 42 into the aperture 162 provided in the end wall 150 of the bracket 146, as illustrated in FIGURE 19.

Figure 18:
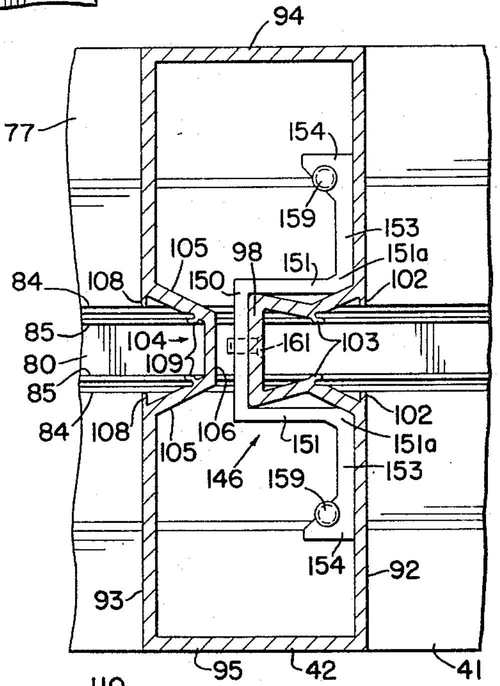
FIGURE 18 is a view similar to FIGURE 17 and illustrates the method of assembling two other frame members of this invention together by the bracket of this invention.

The left-hand vertical mullion 42 is adapted to be secured to the horizontal sill 41 in the manner illustrated in FIGURE 18.

In particular, a bracket 146 had previously been secured to the inner surface means 77 of the sill 41 by the fastening members 159 before the sill 41 was secured to the wall 49. The mullion 42 is then telescoped over the bracket 146, as illustrated in FIGURE 18, whereby the end wall 98 and side walls 97 of the mullion 42 are received in the channel 152 of the bracket 146, with the end wall 98 abutting the end wall 150 of the bracket 146 and the inner surface means 92 abutting the legs 153 of the bracket 146. The end wall 98 of the mullion 42 is then secured to the end wall 150 of the bracket 146 by the fastening member 161, as illustrated in FIGURE 18.

After the frame members 41, 42 and bases 110 of the frame members 43 have been assembled together in the above manner, the bases 110 can be further secured to the wall 49 of the appropriate building, in the manner illustrated in FIGURE 10, wherein anchor bolt means 163 pass through suitable apertures formed in the end walls 126 thereof into the supporting structure 164 of the wall 49 to firmly anchor the bases 110 thereto.

Subsequently, a plurality of sections 111 are cut from the section member stock 133 in lengths sufficient to span the spaces 44, 45 and 46 between the vertical jambs 41 and the mullions 42. One section 111 for each opening 44, 45 and 46 is then snap-fitted to the respective base 110, in the manner illustrated in FIGURES 20 and 21 and previously described, to define part of the inner surface means 112 and channel 114 thereof for a purpose hereinafter described.

The ends of the sections 111 are cut away adjacent the jambs 41 and mullions 42 to permit the same to clear the brackets 146 secured to the inner surface means 77 of the jambs 41 and mullions 42, as illustrated in FIGURE 17.

Instead of securing the upper end of the left-hand mullion 42 and left-hand door jamb 42 to the base 110 of the frame member 43 by the brackets 146, in the manner illustrated in FIGURE 19, when only a single header 43 is utilized, the sections 111 secured to the base 110 can be utilized to wedge the mullion 42 and left-hand door jamb 42 therebetween, as illustrated in FIGURE 1, to positively hold the upper ends of the mullion 42 and door jamb 42 in the proper position relative to the frame member 43.

The remaining frame members 42 and 43 can then be assembled together by the brackets 146 in the above manner to complete the openings 46, 47 and 48.

Therefore, it can be seen that the frame construction 40 can be formed in place in the opening provided in the wall 49, if desired, in a simple and effective manner.

However, the frame construction 40 can be assembled together in a place remote from the wall 49 in the above manner by the brackets 146 and, thereafter, inserted into the opening provided in the wall 49 and secured thereto by the aforementioned fastening members or anchor means 156 and 163.

In either event, only one section 111 is assembled to the base 110 of the header 43 for each of the openings 44–47 thereof to permit the panel means 50–53 to be inserted therein by the method of this invention now to be described.

Since the panel means 50, 51, 52 and 53 are placed in the respective openings 44, 45, 46 and 47 in substantially the same manner, only the positioning of the panel means 50 in the opening 44 will be described, as it is to be understood that the other panel means 51, 52 and 53 are to be placed in their respective openings 45, 46 and 47 in the same manner.

Before the oversized panel means 50 is to be positioned in the opening 44 of the frame construction 40, lengths of resilient holding means 165, FIGURE 11, are disposed in one side of the channels of the bounding frame members 41, 42 and 43, in the manner hereinafter described.

The resilient holding means 165 can be formed of any suitable material, and, in the embodiment illustrated in the drawings, the holding means 165 is formed of neoprene.

The holding means 165 has a holding surface 166 medially interrupted by a semi-circular groove 167 to increase the flexibility of the holding means 165; the remaining portion of the holding surface 166 may be serrated, as illustrated, to further enhance the holding effect thereof. A flange 168 extends outwardly from the other side of the holding means 165 and defines a groove 169 at one end thereof and a groove 170 at the other end thereof, the grooves 169 and 170 respectively receiving the angularly disposed lips of a particular channel-defining side wall, as illustrated in FIGURES 8, 9 and 10.

For example, as illustrated in FIGURE 21, a strip of the holding means 165 is adapted to have the flange 168 thereof press-fitted into the groove 139 of the side wall 113 of the section 111, whereby the lips 140 and 141 of the side wall 113 are respectively received in the grooves 169 and 170 of the holding member 165 to thereby retain the holding means 165 in the groove 139 of the section 111.

The holding means 165 can be readily disposed in such groove 139 by a simple rolling operation whereby the holding means 165 is press-fitted into the groove 139, so that the lips 140 and 141 will be received in the grooves 169 and 170 of the holding means 165 and hold the flange 168 therebetween.

The holding means 165 are disposed on one side of the frame members 41, 42 and 43 bounding the opening 44 and the frame construction 40, as illustrated in FIGURES 22–25, the holding means 165 being disposed on the side of the particular frame members 41 and 42 which corresponds to the side that the section 111 is carried on the frame member 43.

Figure 22:
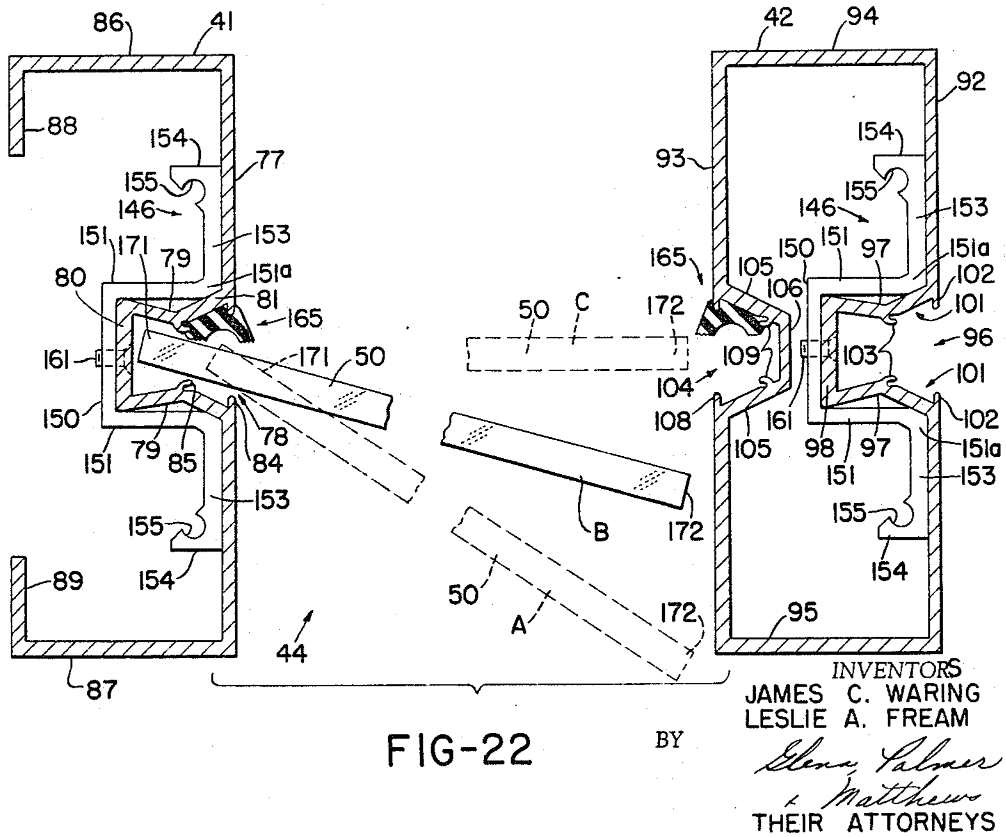
FIGURE 22 is a top cross-sectional view, with background removed, illustrating the inial steps for inserting a panel means in one of the openings of one of the frame constructions of this invention.
Figures 23, 24, 25:
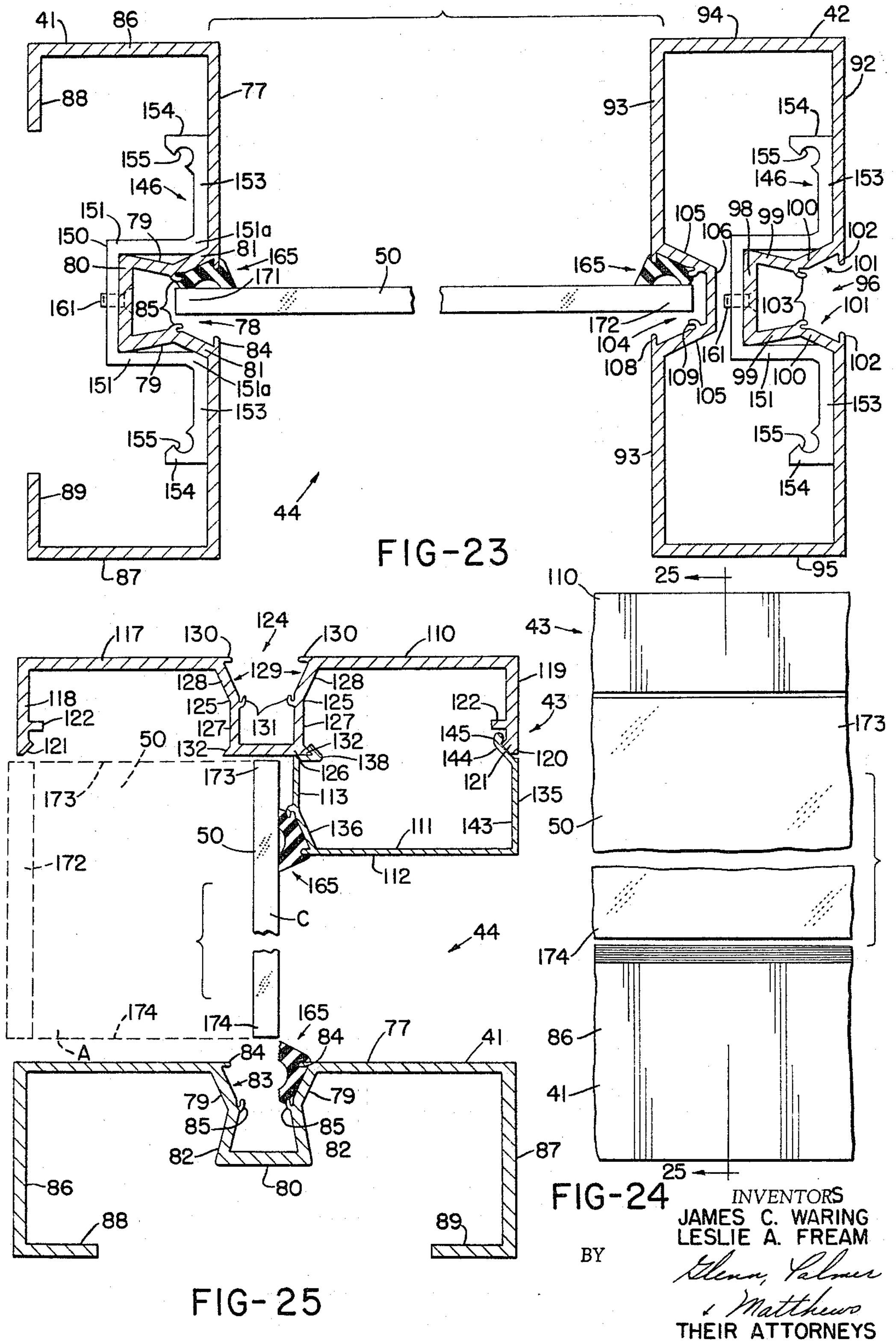
FIGURE 23 is a view similar to FIGURE 22 and illustrates the method of positioning the panel means of FIGURE 22 in the channels of the two opposed frame members illustrated in FIGURE 22.
FIGURE 24 is a fragmentary, side elevation view of the assembly illustrated in FIGURE 23.
FIGURE 25 is an enlarged, cross-sectional view of the assembly illustrated in FIGURE 24 and is taken on line 25—25 thereof with background removed.

The rectangular panel means 50 to be inserted in the opening 44 of the frame construction 40 has a pair of opposed side edges 171 and 172, FIGURE 22, and a pair of opposed top and bottom edges 173 and 174, FIGURE 25.

As illustrated in FIGURE 22, the overall width of the panel means 50 between the side edges 171 and 172 thereof is greater than the distance between the facing inner surface means 77 and 93 of the vertically disposed frame members 41 and 42 bounding the side edges of the opening 44, but is smaller than the distance between the end walls 80 and 106 of the frame members 41 and 42. Similarly, the distance between the top and bottom edges 173 and 174 of the panel means 50 is greater than the distance between the inner surface means 112 of the frame member 43 and the inner surface means 77 of the bottom sill 41, as illustrated in FIGURE 25, but is smaller than the distance between the end wall 126 of the base 110 and the inner surface means of the horizontal sill 41 to permit the installer to grasp the edges 173 and 174 thereof.

As illustrated in FIGURES 22 and 25, the panel means 50 is adapted to be angularly inserted in the opening 44 of the frame construction 40 on the side opposite to the attached section 111 of the header 43 by having the side edge 171 thereof pushed toward the channel 78 of the vertical frame member 41, as illustrated in the dotted position A in FIGURE 22 and FIGURE 25. While the panel means 50 is angularly disposed in the position A, the top and bottom edges 173 and 174 thereof respectively clear the leg 118 of the base 110 and the inner surface means 77 of the horizontal sill 41, in the manner illustrated in FIGURE 25.

While the panel means 50 is held in the vertical position illustrated in FIGURE 25, the panel means 50 is pivoted from the position A to the position B, illustrated in full lines in FIGURE 22, while being axially moved toward the vertical frame member 41. In this manner the end 171 of the panel means 50 is fully received in the channel 78 of the vertical jamb 41, to permit the panel means 50 to be subsequently pivoted into the plane defined between the channels 78 and 104 of the vertical jamb 41 and mullion 42, as illustrated in the dotted position C in FIGURE 22, whereby the other side edge 172 of the panel means 50 clears the inner surface means 93 of the mullion 42.

When the panel means 50 has been disposed into the position C illustrated in FIGURE 22, the same can be shifted axially to the right a suitable distance whereby the side edge 172 thereof enters the channel 104 of the vertical mullion 42, in the manner illustrated in FIGURE 23. In this manner the respective side edges 171 and 172 of the panel means 50 are respectively disposed in the channels 78 and 104 of the vertical jamb 41 and mullion 42, as illustrated in FIGURE 23.

Thus, because the channel 78 of the vertical jamb 41 has an hourglass cross-sectional configuration, as best illustrated in FIGURE 22, the oversized panel means 50 can be inserted into the channel 78 at an angle relative thereto and then be pivoted to the position illustrated by the dotted lines at C to permit the oversized panel means 50 to be axially shifted to fill both channels 78 and 104 of the vertical jamb 41 and mullion 42, as illustrated in FIGURE 23.

Similarly, the channel 96 of the left-hand mullion 42 provides means for permitting the panel means 51 to be angularly inserted in the opening 45 of the frame construction 40.

When the panel means 50 is pivoted from the position A to the position C, as illustrated in FIGURE 25, the upper edge 175 of the panel means 50 is disposed closely adjacent the end wall 126 of the base 110 of the frame member 43, while the other end 174 thereof is disposed above the channel 78 of the horizontal sill 41 in the manner illustrated in FIGURES 24 and 25.

Figures 26, 27:
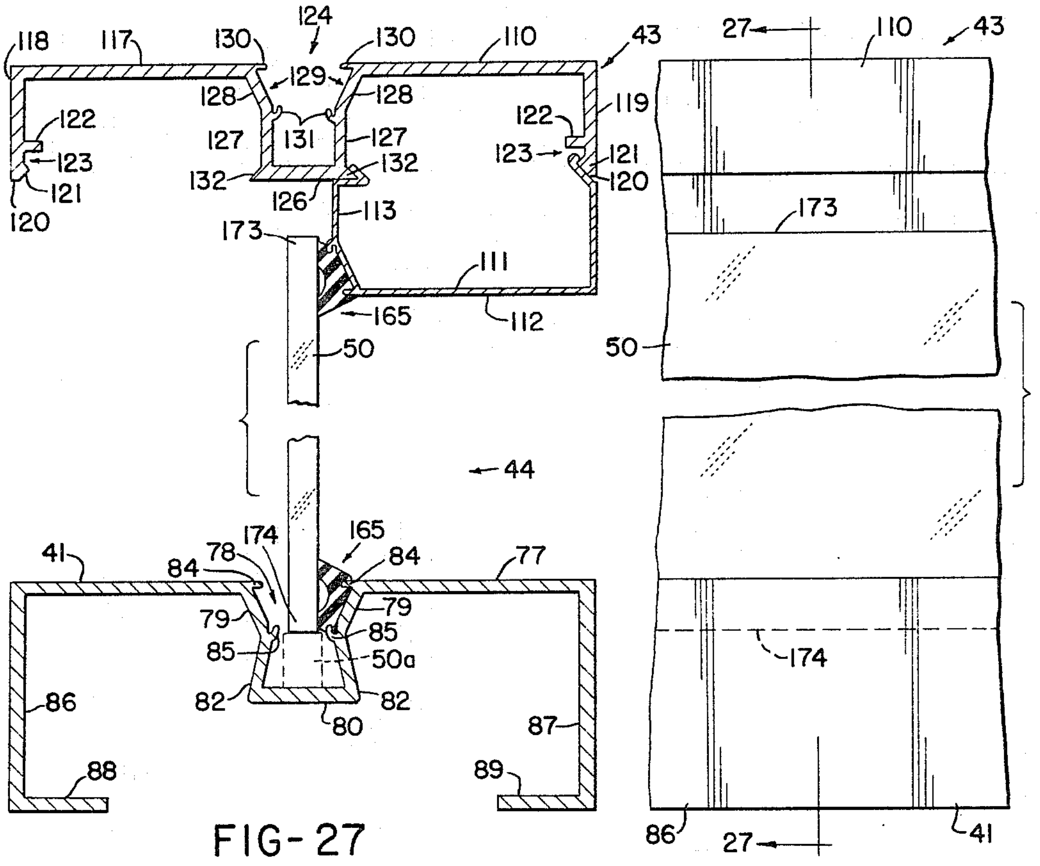
FIGURE 26 is a view similar to FIGURE 24 and illustrates the panel means disposed in the channel of the lower frame member.
FIGURE 27 is a cross-sectional view taken on line 27—27 of FIGURE 26 with background removed.

After the panel means 50 has been shifted axially, as illustrated in FIGURE 23, the panel means 50 can be shifted vertically downwardly from the position illustrated in FIGURE 25 to the position illustrated in FIGURE 27, whereby the lower edge 174 of the panel means 50 is received in the channel 78 of the horizontal sill 41, while the other end 173 thereof is still superimposed against the side wall 113 of the section 111 secured to the base 110, as best illustrated in FIGURES 26 and 27.

If desired, suitable supporting means 50*a*, FIGURE 27, can be disposed in the channel 78 of the sill 41 to properly position the panel means 50 therein and permit the edge 174 to rest thereon while the framing of the panel means is completed.

Figure 28:
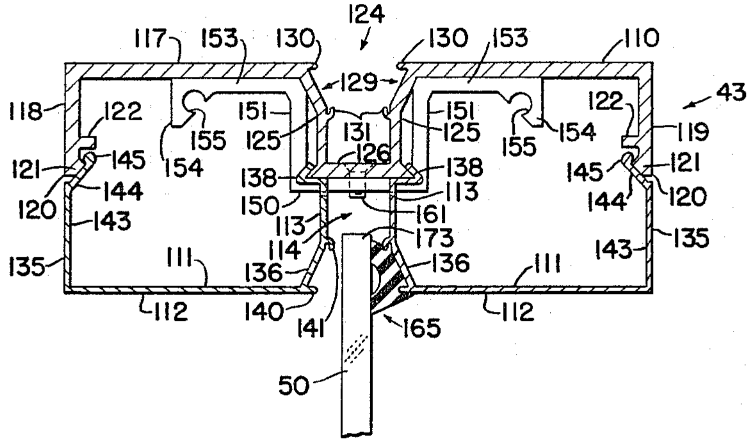
FIGURE 28 is a view similar to FIGURE 27 and illustrates the method of assembling the remaining section to the top frame member of the assembly illustrated in FIGURE 27.

Thereafter, the other section 111 of the frame member 43 is snap-fitted in place, in the manner illustrated in FIGURE 28, whereby the upper edge 173 of the panel means 50 is completely disposed within the channel 114 of the frame member 43.

Therefore, it can be seen that although the panel means 50 has an overall size greater than the opening 44 provided in the frame construction 40, the panel means 50 is adapted to be disposed in such opening in the above manner in a relatively rapid and easy manner.

After the panel means 50 has been positioned in the opening 44 in the above manner, the holding means 165 is disposed in the other side of the respective channels of the frame members 41, 42 and 43 in the manner illustrated in FIGURE 12, to positively hold the panel means 50 in a fixed position relative to the frame members 41, 42 and 43.

In particular, the holding means 165 can be press-fitted into the respective groove of the side wall of the respective channel by a simple rolling tool 175, which compresses the flange 168 of the holding means 165 into the respective groove of the side wall of the respective frame member 41, 42 or 43, to squeeze the panel means 50 between the opposed holding means 165 disposed on each side of the panel means 50, as illustrated in FIGURES 8, 9 and 10. Because the holding means 165 are disposed under compression on each side of the panel means 50, the holding surfaces 166 thereof squeeze the panel means 50 therebetween whereby axial movement of the panel means 50 relative to the frame members 41, 42 and 43 is prevented.

Therefore, it can be seen that it is relatively simple to insert and hold an oversized panel means in the various openings 44–47 of the frame construction 40.

It should be understood that the method of inserting the panel means 50 in the opening 44 of the frame construction 40, as illustrated in FIGURES 22–28, is merely exemplary of one of the many methods of this invention that can be utilized.

For example, none of the holding means 165 need be placed in the channels of the frame members 41–43 before the panel means 50 is inserted therein, as the holding means 165 can be added at a later time. Further, neither section 111 of the frame member 43 need be secured to the base 110 before the panel means 50 is inserted in the channels of the other frame members 41 and 42, as the sections 111 can be added after the panel means 50 has been so positioned.

Such ease of inserting an oversized panel means in a particular opening of a frame construction of this invention is accomplished by the fact that one of the frame members bordering the opening is formed from a frame member 43, whereby one of the sections 111 thereof can be added thereto after the panel means has been inserted in the channels of the other frame members bordering that opening. Also, one of the frame members bordering the opening has a channel provided with an hourglass cross-sectional configuration to permit the panel means to be initially angularly inserted in the opening.

Figure 29:
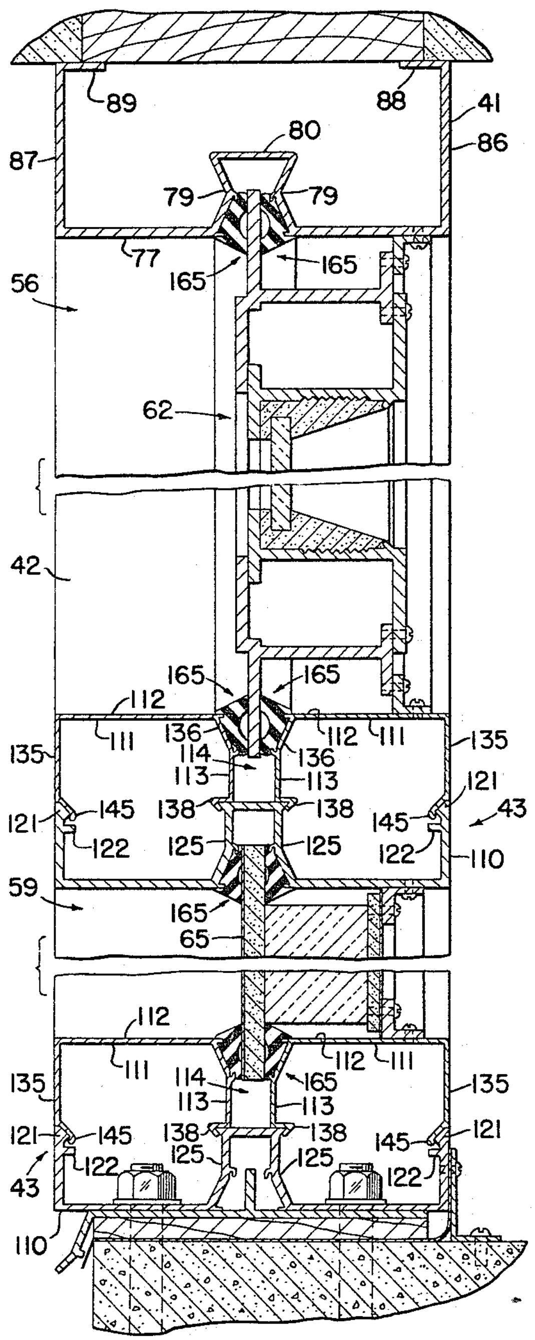
FIGURE 29 is a cross-sectional view taken on line 29—29 of FIGURE 2 and illustrates the various assembled frame members and panel means thereof.

In particular, as illustrated in FIGURE 29, the panel means 62 is adapted to be disposed in the opening 56, because the intermediate mullion is formed by a frame member 43. Similarly, the lower panel means 65 is adapted to be disposed in the opening 59 of the frame construction 55, because the lower sill is formed by a frame member 43, the vertical mullions and jambs being formed by frame members 41 and 42, in the manner previously described, the jamb 41 providing a channel 78 having an hourglass cross-sectional configuration.

Figure 30:
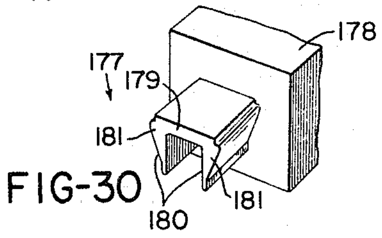
FIGURE 30 is a fragmentary, perspective view illustrating the method of forming an insert of this invention.
Figure 32:
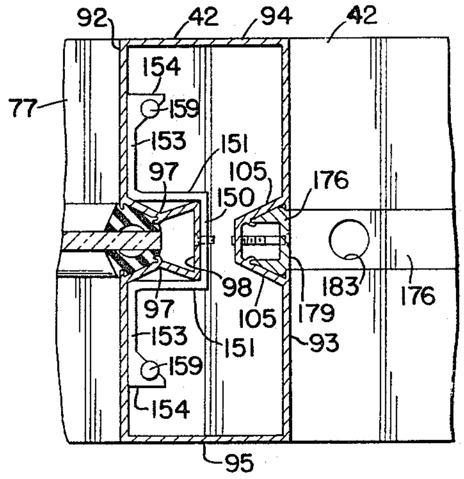
FIGURE 32 is an enlarged, fragmentary, cross-sectional view taken on line 32—32 of FIGURE 3.

When it is desired to dispose a door in one of the openings provided by one of the frame constructions of this invention, such as the opening 71 illustrated in FIGURE 3, the various channels interrupting the inner surface means of the frame members 41 and 42 bordering the opening 71 can be filled with inserts 176 of this invention, as illustrated in FIGURE 32, and cut from insert member stock 177 illustrated in FIGURE 30 and extruded by a conventional extruding apparatus 178, in a manner well known in the art.

The insert member stock 177 is substantially U-shaped and comprises a flat end wall 179 having a pair of legs 180 extending from the side edges of the end wall 179, the legs 180 having outwardly directed flanges 181 which are adapted to be respectively received in the particular grooves of the channel-defining side walls of any of the frame members 41 and 42, in the manner illustrated in FIGURE 32. Thus, the inserts 176 can be cut to the desired lengths and telescoped into the particular channel of the frame members bordering the opening to receive the door.

As illustrated in FIGURES 3 and 32, the door 74 can be pivotally secured to the insert 176 disposed in the upper frame member 42 by having a pivot pin 182 respectively received in a suitable opening 183 formed in the desired location in the insert 176.

The insert 176, when disposed in the channel of the respective frame member 41 and 42, has the end wall 179 thereof disposed flush with the particular inner surface means of the respective frame member 41 or 42, so as to provide a smooth flat inner surface thereof.

Figure 31:
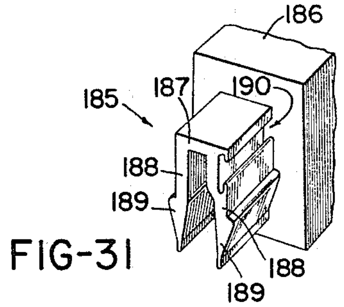
FIGURE 31 is a view similar to FIGURE 30 and illustrates the method of forming another insert of this invention.

A suitable door stop means 184 can be provided in the right-hand and left-hand door jambs 41 and 42 of the frame construction 69 of FIGURE 3 and can be formed by being cut from insert member stock 185 illustrated in FIGURE 31 and extruded by a conventional extruding apparatus 186 in a manner well known in the art.

Figure 33:
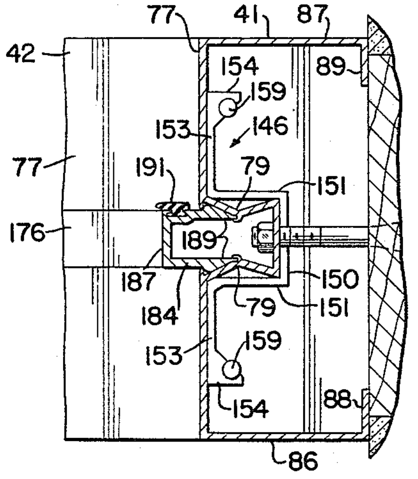
FIGURE 33 is a view similar to FIGURE 32 and is taken on line 33—33 of FIGURE 3.

As illustrated in FIGURES 31 and 33, the insert 184 and the insert member stock 185 are substantially U-shaped and comprise a flat end wall 187 having a pair of opposed legs 188 extending from the side edges thereof, the outer ends of the legs 188 carrying flanges 189, in a manner similar to flanges 181 of the insert 176, to be received in the grooves provided in the channel-defining side walls of a particular frame member 41, 42 or 43.

One of the legs 188 of the insert 184 has a channel 190 formed therein which projects beyond the frame member 41 in the manner illustrated in FIGURE 33 when the insert 184 is disposed therein, whereby a suitable weather-stripping gasket 191 can be press-fitted in the groove 190 to provide weather-stripping means for the door 74.

Therefore, it can be seen that the frame members 41, 42 and 43 of this invention can be assembled together in any desired manner to form various openings which are adapted to receive panel means or door means, as desired, because the frame members have suitable channels to receive either panel means or inserts whereby additional frame members need not be provided for framing doors.

Accordingly, this invention provides novel frame members that can be secured together by novel brackets of this invention to form frame constructions having any desired number of openings to receive panel means or doors, the openings being of any desired size and configuration. The frame members are so constructed and arranged that each opening bounded thereby is defined by inner surface means of a plurality of frame members, each inner surface means being interrupted by a channel to receive one edge of an oversized panel means to fill the respective opening or an insert of this invention to modify the respective opening to receive a door or the like.

Not only can the frame members be assembled together in a minimum of time and effort by the methods of this invention to provide a frame construction having any desired configuration and any desired number of openings, but also the openings can receive oversized panel means or doors as desired according to the methods of this invention in a minimum of time and effort, the oversized panel means being firmly held in a fixed position relative to the frame construction by novel holding means of this invention.

While the form of the invention now preferred has been disclosed as required by the statutes, other forms may be used, all coming within the scope of the claims which follow:

What is claimed is:

1. In combination, a plurality of operatively interconnected frame members each having an inner surface means defining part of an opening bounded by said frame members, each of said inner surface means being interrupted by a channel, said channel of one of said frame members having an hourglass-like cross-sectional configuration, said hourglass-like channel being defined by an end wall of the respective frame member and a pair of opposed side walls thereof, said end wall being spaced from said inner surface means, each side wall being formed of two sections, one pair of adjacent sections of said side walls converging toward each other as they extend away from said end wall, the other pair of adjacent sections of said side walls diverging away from each other as they approach said inner surface means of the respective frame member, each section of said other pair of sections of said side walls having a groove, each said groove being bounded by a pair of angularly disposed lips converging toward each other as they extend away from the respective side wall, one lip of each pair of lips being adjacent said inner surface means of the respective frame member and the other lip of each pair of lips being adjacent the juncture of the two sections of the respective side wall, a panel means disposed in said opening and having a plurality of edge means respectively received in said channels of said frame members whereby the overall size of said panel means is greater than said opening, and resilient holding means disposed in said channels to hold said panel means in a fixed position relative to said frame members, said holding means disposed in said hourglass-like channel being held therein by being received in said grooves thereof.

2. A frame construction comprising a plurality of operatively interconnected frame members each having an inner surface means defining part of an opening bounded by said frame member, each of said inner surface means being interrupted by a channel, said channel of one of said frame members having an hourglass-like cross-sectional configuration, said hourglass-like channel being defined by an end wall of the respective frame member and a pair of opposed side walls thereof, said end wall being spaced from said inner surface means, each side wall being formed of two sections, one pair of adjacent sections of said side walls converging toward each other as they extend away from said end wall, the other pair of adjacent sections of said side walls diverging away from each other as they approach said inner surface means of the respective frame member, each section of the other pair of sections of said side walls having a groove, each said groove being bounded by a pair of angularly disposed lips converging toward each other as they extend away from their respective side wall, one lip of each pair of lips being adjacent said inner surface means of the respective frame member and the other lip of each pair of lips being adjacent the juncture of the two sections of the respective side wall, and resilient holding means disposed in said grooves to hold a panel means therebetween.

3. A frame member for a frame construction or the like and having a surface means interrupted by a channel throughout the length of said frame member, said channel having an hourglass-like cross-sectional configuration, said hourglass-like channel being defined by an end wall of the frame member and a pair of opposed side walls thereof, said end wall being spaced from said surface means, each side wall being formed of two sections, one pair of adjacent sections of said side walls converging toward each other as they extend away from said end wall, the other pair of adjacent sections of said side walls diverging away from each other as they approach said surface means, each section of said other pair of sections of said side walls having a groove, each said groove being bounded by a pair of angularly disposed lips converging toward each other as they extend away from the respective side wall, one lip of each pair of lips being adjacent said surface means of said frame member and the other lip of each pair of lips being adjacent the juncture of the two sections of the respective side wall, and resilient holding means disposed in said grooves for holding a panel therebetween.

4. A frame member as set forth in claim 3 wherein another surface means opposed to said first-named surface means of said frame member is provided with a channel.

5. A frame member as set forth in claim 3 wherein said frame member includes a plurality of parts mechanically locked together.

6. A frame member as set forth in claim 3 wherein said frame member includes a plurality of parts mechanically locked together, two of said parts respectively providing said side walls and said surface means.

7. A frame member as set forth in claim 3 wherein said frame member has another surface means opposed to said first-named surface means and is provided with a channel said last-named channel being defined by a pair of opposed side walls and an end wall.

8. A frame member as set forh in claim 7 wherein said end walls for said two channels comprise a single wall closing off both of said channels at the inner ends thereof.

9. A frame member as set forth in claim 7 wherein said end walls of said two channels comprise two walls respectively spaced from each other.

References Cited by the Examiner

UNITED STATES PATENTS

| | | | |
|---|---|---|---|
| 1,870,250 | 8/1932 | Hammerl | 29—462 |
| 1,955,181 | 4/1934 | Goddard | 189—78 |
| 2,202,690 | 5/1940 | Fix | 29—462 |
| 2,386,151 | 10/1945 | Trautretter | 189—78 |
| 2,629,467 | 2/1953 | Fry | 189—75 |
| 2,701,041 | 2/1955 | Toth | 189—78 |
| 2,775,325 | 12/1956 | Knebel | 189—76 |
| 2,852,113 | 9/1958 | Bancroft | 189—76 |
| 2,914,145 | 11/1959 | Bensen | 52—235 |
| 2,972,396 | 2/1961 | Minick | 189—36 |
| 2,983,969 | 5/1961 | Muessel | 20—56.4 |
| 3,016,993 | 1/1962 | Owen | 52—397 |
| 3,023,859 | 3/1962 | Muessel | 52—260 |
| 3,077,959 | 2/1963 | McGow et al. | 189—35 |
| 3,136,395 | 6/1964 | Rebele | 52—397 X |

FRANK L. ABBOTT, *Primary Examiner.*

RICHARD W. COOKE, Jr., CHARLES E. O'CONNELL, *Examiners.*

R. S. VERMUT, *Assistant Examiner.*